United States Patent
Alvelda et al.

(10) Patent No.: US 6,222,508 B1
(45) Date of Patent: *Apr. 24, 2001

(54) VLSI VISUAL DISPLAY

(75) Inventors: Phillip Alvelda, Berkeley, CA (US); Thomas F. Knight, Jr., Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/414,709

(22) Filed: Oct. 8, 1999

Related U.S. Application Data

(63) Continuation of application No. 08/922,268, filed on Sep. 2, 1997, which is a continuation of application No. 08/519,269, filed on Aug. 25, 1995, now Pat. No. 5,867,134.

(51) Int. Cl.$^7$ ...................................................... G09G 3/02
(52) U.S. Cl. .................................. 345/8; 345/2; 345/205; 345/87; 348/51; 348/52; 348/53; 348/54
(58) Field of Search ............................... 345/7, 8, 9, 205; 348/51–60

(56) References Cited

U.S. PATENT DOCUMENTS

| | | | |
|---|---|---|---|
| 4,239,346 | * 12/1980 | Lloyd | 349/44 |
| 4,266,223 | 5/1981 | Frame | 340/719 |
| 4,361,384 | 11/1982 | Bosserman | 350/174 |
| 4,572,616 | 2/1986 | Kowel et al. | 350/335 |
| 4,636,866 | 1/1987 | Hattori | 358/236 |
| 4,748,444 | 5/1988 | Arai | 340/785 |
| 4,869,575 | * 9/1989 | Kubik | 345/8 |
| 4,934,773 | * 6/1990 | Becker | 359/214 |
| 5,003,300 | 3/1991 | Wells | 345/8 |

(List continued on next page.)

FOREIGN PATENT DOCUMENTS

| | | |
|---|---|---|
| 627850A1 | 12/1994 | (EP) . |
| 643314A2 | 3/1995 | (EP) . |
| WO 92/12453 | 7/1992 | (WO) . |
| WO 95/11473 | 4/1995 | (WO) . |

OTHER PUBLICATIONS

John O. Merritt, Scott Fisher, chairs/editors, "Stereoscopic Displays and Applications", vol. 1256, Spie–The International Society for Optical Engineering. Feb. 1990.

Robert F. Sproull, "Raster Graphics for Interactive Programming Environments", ACM 1979.

Daniel J. Burns, "Microcircuit Analysis Techniques Using Field–Effect Liquid Crystals", *IEEE Transactions On Electron Devices*, vol. Ed.–26, No. 1 Jan. 1979.

D.J. Channin, "Crystal Technique for Observing Integrated––Circuit Operation", *IEEE Transactions on Electron Devices*, Oct. 1974.

*Primary Examiner*—Bipin Shalwala
*Assistant Examiner*—Vincent E. Kovalick
(74) *Attorney, Agent, or Firm*—Testa, Hurwitz & Thibeault, LLP

(57) ABSTRACT

The present invention provides a visual display including a high resolution miniature display compatible with VLSI technology and an optical system such as an optical magnifier used to enlarge the images display on the miniature display to be visible to the naked eye. The miniature display includes a VLSI backplane having an array of display elements monolithically formed with its driving circuit on a single crystalline semiconductor. Signal processing circuit or a microprocessor used to process image signals for the display may also be formed monolithically with the array and its driving circuit. The array may be designed using a silicon software compiler program to have randomly displaced elements or super-pixels for reducing image aliasing. The array may also be designed to have display elements positioned and scaled to compensate for the optical distortion introduced by the magnifier.

12 Claims, 10 Drawing Sheets

U.S. PATENT DOCUMENTS

| | | | |
|---|---|---|---|
| 5,048,077 | 9/1991 | Wells et al. | 379/96 |
| 5,126,865 | 6/1992 | Sarma | 345/103 |
| 5,155,615 | 10/1992 | Tagawa | 359/213 |
| 5,309,169 | 5/1994 | Lippert | 345/8 |
| 5,321,416 | 6/1994 | Bassett et al. | 345/8 |
| 5,331,333 * | 7/1994 | Tagawa et al. | 345/7 |
| 5,414,544 * | 5/1995 | Aoyagi et al. | 349/13 |
| 5,479,187 * | 12/1995 | Chen | 345/102 |
| 5,485,172 | 1/1996 | Sawachika et al. | 345/8 |
| 5,486,946 | 1/1996 | Jachimowicz et al. | 359/263 |
| 5,539,422 | 7/1996 | Heacock et al. | 345/8 |
| 5,572,343 * | 11/1996 | Okamura et al. | 349/74 |
| 5,579,026 * | 11/1996 | Tabata | 345/8 |
| 5,642,221 * | 6/1997 | Fischer et al. | 359/477 |
| 5,682,173 | 10/1997 | Holakovszky et al. | 345/8 |
| 5,825,340 * | 10/1998 | Torizuka et al. | 345/8 |

* cited by examiner

VLSI VISUAL DISPLAY

This is a continuation of application Ser. No. 08/922,268, filed Sep. 2, 1997, which is a continuation of application Ser. No. 08/519,269, filed Aug. 25, 1995 now U.S. Pat. No. 5,867,134.

FIELD OF THE INVENTION

The present invention relates to visual displays and more particularly to visual displays having miniature displays that are compatible with very large scale integrated ("VLSI") circuit technology.

BACKGROUND OF THE INVENTION

Current commercially available electronic displays are dominated by cathode ray tubes ("CRTs") and liquid crystal displays ("LCDs"). LCDs offer advantages in power, size, and safety, while CRTs are well understood and inexpensive to manufacture. Recent advancements in LCD technology have led to the development of large area, high resolution LCDs, initially using a passive matrix scanning technique (i.e., pixels in the display are directly controlled by the address lines), and more recently using active matrix addressing techniques (i.e., the pixels in the display are controlled by addressing transistors associated with each pixel).

Compared with passive matrix LCDs, active matrix LCDs produce higher quality images but require greater capital investments in manufacturing. To manufacture active matrix LCDs, photolithographic masks of the same size as the LCDs and processing equipment suitable for handling the same size substrate are required. In addition, active matrix displays are generally built on glass substrates using either amorphous or polycrystalline thin film transistors ("TFTs") which typically exhibit poor electrical characteristics and low yield. Further, because thin film transistors typically operate at a relatively low speed, the speed of the display is thus limited. Moreover, due to the low device density and low yield associated with thin fin transistors, the resolution of such LCDs is limited.

Besides the above-described TFT LCDS, there has been a great deal of interest in developing silicon backplane LCDs. In contrast to TFT LCDs which use thin film transistor circuits fabricated on a glass substrate as a backplane, silicon backplane LCDs use integrated circuits fabricated on single crystalline silicon substrates as backplanes. Due to the advantages of silicon integrated circuits over TFT circuits, silicon backplane LCDs operate at a higher speed and offer higher resolution and higher yield.

Kaneko, E., "Liquid Crystal TV Displays: Principles and Applications Of Liquid Crystal Displays," KTK Scientific Publishers, 1987, describes a MOS transistor switch matrix addressed liquid crystal TV display. The TV display comprises a MOS transistor-addressed pixel array formed on a single crystalline silicon substrate; the array is integrated with its driving circuit as a hybrid and is connected to the driving circuits by wire bonding. This TV display suffers several significant drawbacks. First, because the yield for the array decreases drastically with increased array size, the size of the display is limited to about one inch by one inch, which is generally too small to be used as a TV or computer display. Second, the driver circuits are not monolithically integrated with the display array, which makes it expensive to fabricate and which also limits the resolution of the display since it is very difficult to interconnect the driver circuits with an array having a large number of pixels using wire bonding. Consequently, the resolution of the described TV display is limited for the purposes described herein. For example, one of the described TV displays has only 240×240 pixels formed on an area of 3.6 cm×4.8 cm.

Jared et al., "Electrical Addressed Spatial Light Modulator That Uses A dynamic Memory", Optical Letters, (16:22), pp. 1785–1787 (Nov. 15, 1991), describes an electrically addressed spatial light modulator that consists of a silicon VLSI backplane chip and a ferroelectric-liquid-crystal ("FLC") cell. The VLSI chip includes a 64×64 array of pixels located at the center of the chip; it is fabricated using a 2 micron, n-well, complementary metal-oxide-semiconductor ("CMOS") process. The 64×64 pixel array appears to be monolithically formed with its electronic addressing circuits on the VLSI chip. However, this type of modulator would not be useful for image displays because the array area is too small.

Despite the clear advantages of VLSI backplane LCDs over TFT LCDs in speed and resolution, they are not viewable with the naked eye and are not used commercially for image displays.

Accordingly, it is an object of the present invention to provide a visual display that is small in size but has a high resolution and can be seen by the naked eye;

it is another object of the present invention to provide a visual display that is compatible with VLSI technology, operates at a high speed and has low power consumption;

it is a further object of the present invention to provide a visual display with reduced image aliasing; and it is still a further object of the present invention to provide a visual display with reduced optical distortion.

SUMMARY OF THE INVENTION

The present invention provides a visual display which comprises a miniature display compatible with VLSI technology to display thereon images having desired quality but are generally too small to be viewed by the naked eye and an optical system disposed in front of the miniature display for enlarging such images to be visible at the desired image quality.

The miniature display includes an array of display elements of sufficient resolution and a VLSI circuit monolithically integrated with the array for driving the display elements. The VLSI circuit includes input terminals for providing electrical signals thereto to generate the images. The VLSI circuit may further include a signal processing circuit or a microprocessor for processing signals applied through the input terminals to affect the displayed image.

In a preferred embodiment, the visual display includes a miniature display that is a liquid crystal display and the visual display further includes a light source for providing illumination to the liquid crystal display. The liquid crystal display comprises a transparent cover positioned above the array of display elements, a transparent electrode deposited on the surface of the cover facing the array, and liquid crystal material such as dynamic scattering mode liquid crystal material disposed between the array and the transparent electrode.

In another preferred embodiment, a visual display with reduced image aliasing is provided. The visual display includes a miniature display having an array of display elements with the positions of the display elements be displaced by small random distances from the positions of elements in a corresponding symmetrical array. Preferably, the layout of the array is made with the use of a software silicon compiler program to determine the positions and the displacement of the display elements.

In another preferred embodiment, a visual display including a miniature display having an array of super-pixels, each comprising a central display element surrounded by a plurality of ancillary display elements. In the array, the central display elements are directly driven by a VLSI circuit and the ancillary display element are driven in response to electrical signals from neighboring central display elements. Image aliasing in the display is reduced.

In another preferred embodiment, a visual display including a miniature display made to compensate for optical distortion of the optical system used to view the images displayed by the miniature display. The optical distortion of the optical system is characterized by an optical distortion function. The miniature display includes an array of display elements which are positioned and scaled in accordance with an inverse function of such optical distortion function. Preferably, the array is made with the use of a silicon software compiler program to determine the positions of and to scale the display elements.

The present invention also provides a virtual image display which utilizes the visual display of the present. The virtual image display comprises an eye glass frame, at least one lens having a reflective surface mounted therein, and a visual display of the present invention. The visual display is positioned such that images displayed thereon are reflected by the lens into an eye of a person wearing the frame.

Preferably, the reflective surface of the lens is curved in accordance with a three-dimensional elliptical surface, and the visual display and the eye of the viewer are positioned at two focal points of the elliptical surface respectively such that the images displayed by the visual display are reflected by the reflective surface right into the eye of the person wearing the eye glass frame.

BRIEF DESCRIPTION OF THE DRAWINGS

These and other features, objects, and advantages of the present invention will become more apparent from the following detailed description in conjunction with the appended drawings in which.

DETAILED DESCRIPTION OF THE INVENTION

Figure 1:
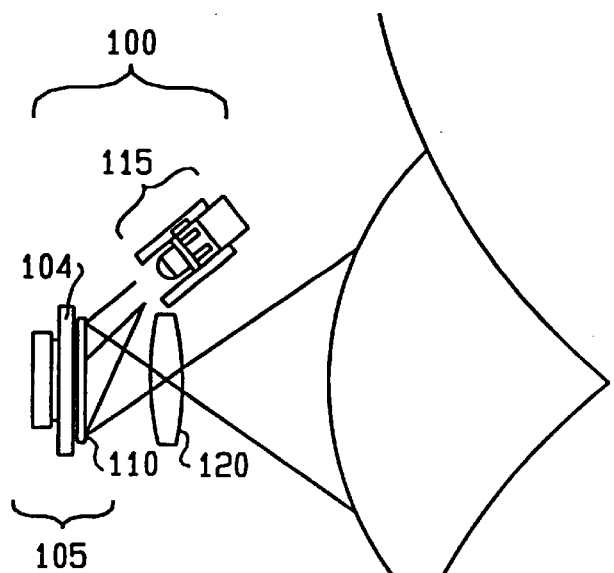
FIG. 1 depicts a reflective-mode visual display of the present invention.

Referring to FIG. 1, a visual display 100 of the present invention comprises a reflective-mode miniature display 105 producing images on its front surface 110, a light source 115 for illuminating front surface 110, and an optical system 120 for magnifying the images displayed by the miniature display so that the images are visible to the naked eye.

Alternatively, a visual display of the present invention (not shown) comprises a miniature display compatible with VLSI technology and includes an array of display elements of sufficient resolution to provide a desired image quality, a VLSI circuit for driving the display elements to form images on the array that are generally too small to be viewed by the naked eye, and an optical system disposed in front of the miniature display for recording such images such that they can be displayed or viewed by the naked eye. The VLSI circuit is monolithically integrated with the array and it includes input terminals for providing electrical signals thereto to generate such images.

Miniature display 105 includes a reflective-mode liquid crystal display 104 and is compatible with VLSI technology. As defined hereinafter, a display is compatible with VLSI technology if it includes an array of display elements for display images thereon and a circuit for driving the array to display the images and if the array and its driving circuit are monolithically formed on a single crystalline semiconductor substrate. Preferably, a display compatible with VLSI technology has a high resolution.

Figure 2:
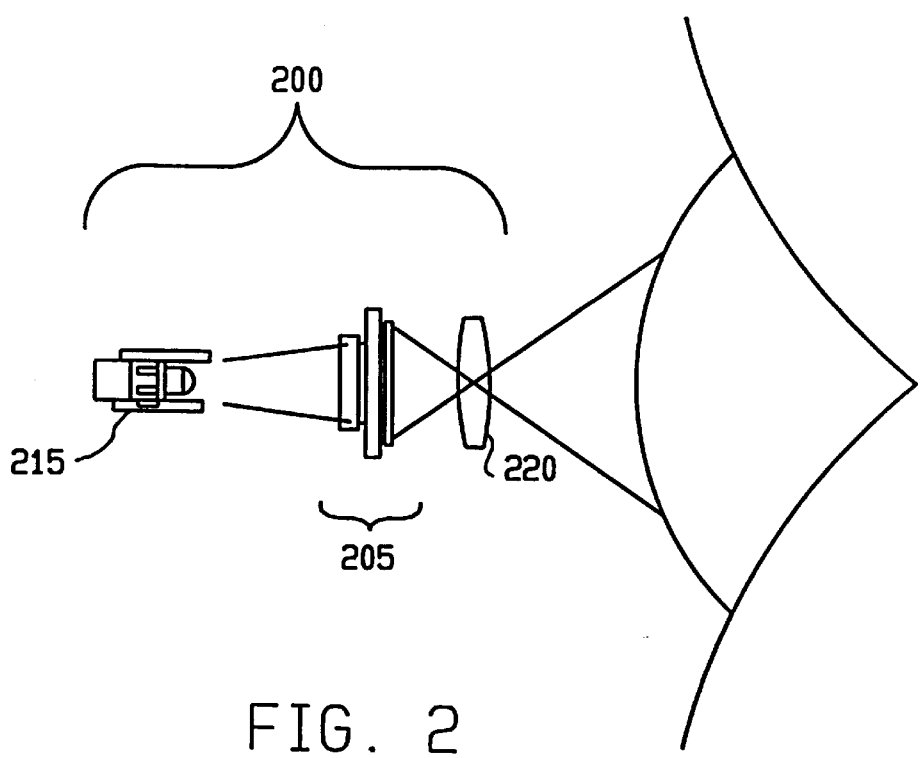
FIG. 2 illustrates a transmissive-mode visual display of the present invention.

Referring to FIG. 2, in an alternative embodiment, a visual display 200 comprises a transmissive-mode miniature display 205 compatible with VLSI technology, a light source 215 for providing a backside illumination, and an optical system 220 for magnifying images displayed on the front side of the miniature display. In a preferred embodiment, the transmissive-mode miniature display is a transmissive-mode liquid crystal display.

Figure 3A:
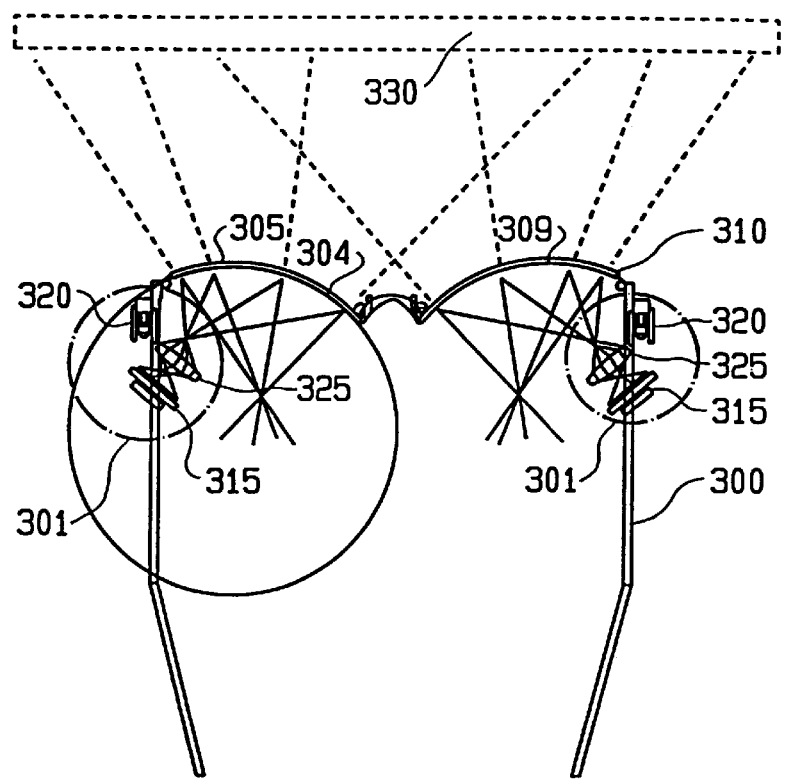
FIGS. 3A and 3B illustrate a virtual image display utilizing the visual displays of the present invention.
Figure 3B:
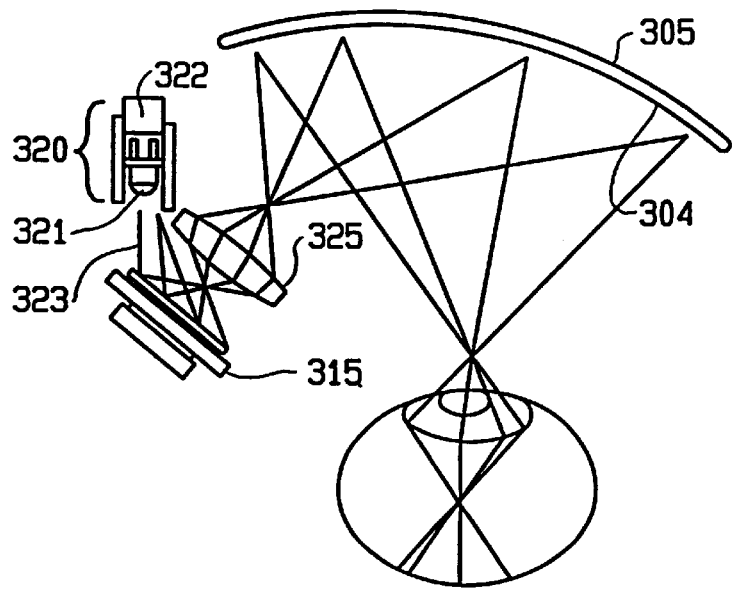

FIGS. 3A and 3B illustrate an eye-glass type virtual image display which utilizes the visual displays described above. The virtual image display comprises an eye glass frame 300, a pair of lenses 305 and 310 mounted on the frame, and two visual displays 301 of the type described above. Lenses 305 and 310 have reflective surfaces 304 and 309, respectively, for reflecting images generated by the visual displays to the eyes of the person wearing the frame. The reflected images are seen by the person as if they were displayed on a distant virtual screen 330.

Preferably, each of the reflective surfaces is curved in accordance with a three-dimensional elliptical surface. Moreover, the visual display is positioned and the frame designed such that the visual display and an eye of a viewer wearing the frame are approximately located at the two focal points respectively of such elliptical surface; this ensures that the image displayed on the visual displays are reflected directly by the elliptical surface into the eyes of the viewer.

The reflective surfaces may be formed to cover the entire lenses or only portions of the lenses for a heads-up display. To provide electrical signals to the liquid crystal displays, the virtual image display may further include a video cassette recorder, a video compact disc player, or a computer (not shown) electrically connected to the liquid crystal displays.

It should be apparent to one skilled in the art that, although FIGS. 3A and 3B depict a virtual display of the present invention with reflective mode visual displays, transmissive-mode visual displays may also be used in place of the reflective-mode visual displays, which is also within the scope of the present invention.

In the preferred embodiment, the miniature display is a liquid crystal display compatible with VLSI technology. The liquid crystal display in accordance with the present invention is described below in conjunction with FIGS. 4–7.

Figure 4:
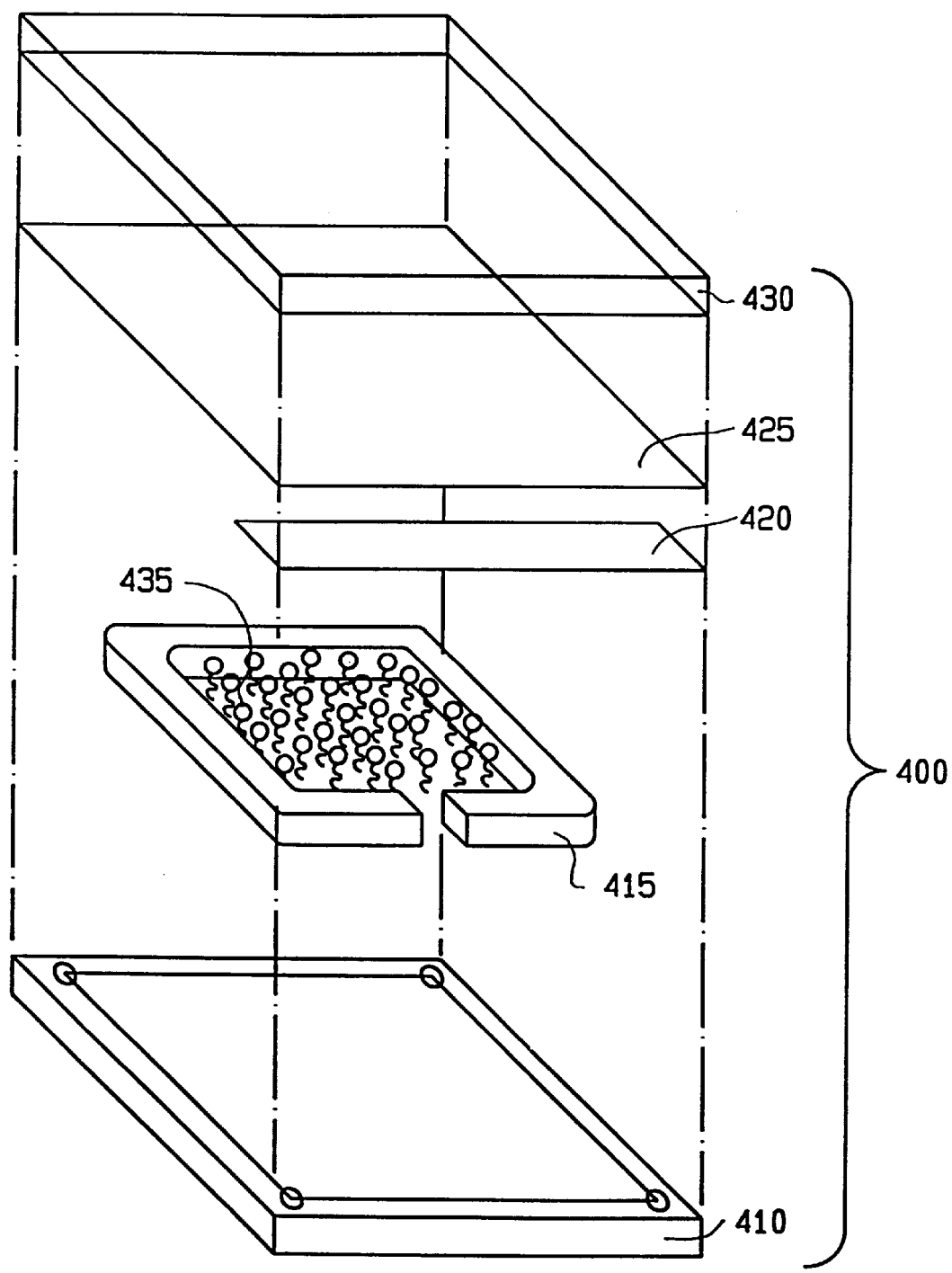
FIG. 4 depicts the physical arrangement of a LCD of the present invention.

FIG. 4 illustrates the physically arrangement of a preferred reflective-mode liquid crystal display. For clarity, the components of the LCD are purposely drawn to be vertically spaced apart. As shown, an LCD 400 of the present invention includes a VLSI backplane 410 and a glass cover 430 having a transparent electrode 425 such as a layer of indium-tin-oxide deposited on the surface of the cover facing the backplane. Disposed between the backplane and the glass cover are a polyamide spacer ring 415, liquid crystal material 435 and a bonding pad 420 used to join the cover glass and the spacer. The VLSI backplane herein refers to an array of display elements and a circuit for driving the array monolithically formed on a single crystalline substrate.

Figure 5A:
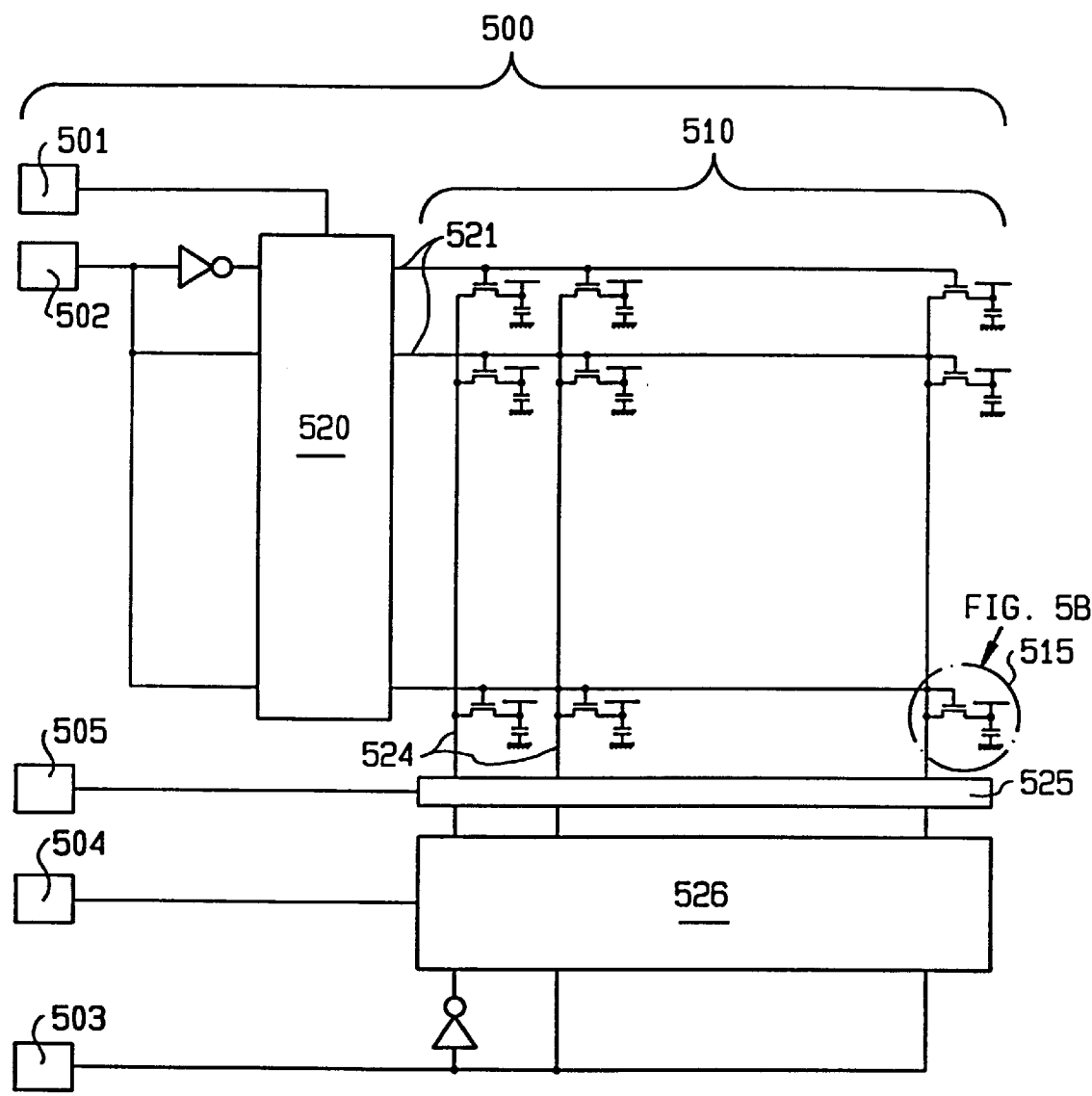
FIGS. 5A–C show the schematic circuit diagram of a VLSI backplane, the circuit diagram and the layout of a single pixel in the VLSI backplane, respectively.

FIG. 5A depicts a schematic circuit diagram of a preferred VLSI backplane 500 which includes an array 510 consisting of rows and columns of display elements 515. Each display element is a minimum controllable display unit and is referred hereinafter as a pixel. To obtain desired resolution, the array contains a large number of pixels formed on a small area. For example, the array may include 2,000 by 2,000 (4 mega) pixels formed on one square centimeter area with each pixel having a dimension of 5 by 5 microns. As it is known to one of skill in the art, this kind of resolution is in general only obtainable by the use of VLSI technology.

In the VLSI backplane, a row scanning bus driver 520, connected to the rows of display elements through a row bus 521, operates to sequentially scan rows of the pixels so that each frame of the images is formed by scanning the entire array line by line. The row scanning bus driver has a clock terminal 501 for receiving an external clock signal and a terminal 502 for receiving a row control signal.

The backplane also includes a video signal buffer 525 connected to the columns of pixels via a column bus 524 and a video signal driver 526 coupled to the video signal buffer. Video signal driver 526 receives a clock pulse signal from terminal 503 and serial video data from terminal 504; it then sequentially shifts the serial video data to form a row of video data to be written into a row of the pixels. The row of data is subsequently provided to the video signal buffer. Upon receiving a synchronized signal at a terminal 505, the video signal buffer provides the row of data to column bus 524 while a row of the pixels is turned on by the row scanning bus driver. Consequently, the row of video data is stored into the row of pixels and a line of image is thus formed. The process is then repeated line by line until a frame of image is formed. Preferably, the row scanning bus driver, the video signal buffer and the video signal driver are all CMOS circuits formed on a single crystalline silicon substrate.

Figure 5B:
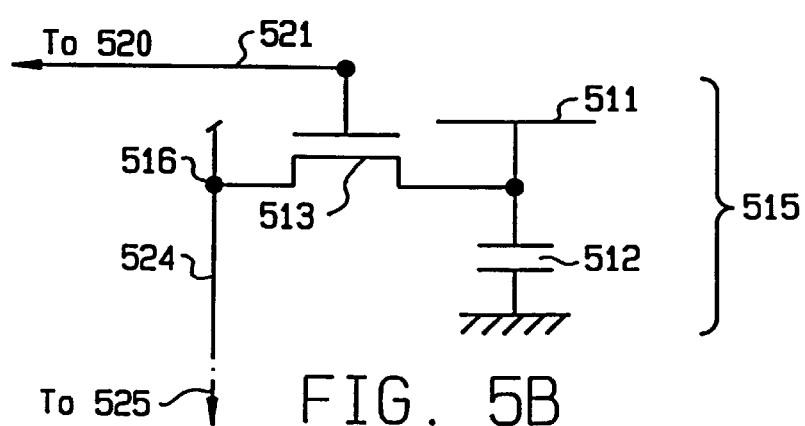
Figure 5C:
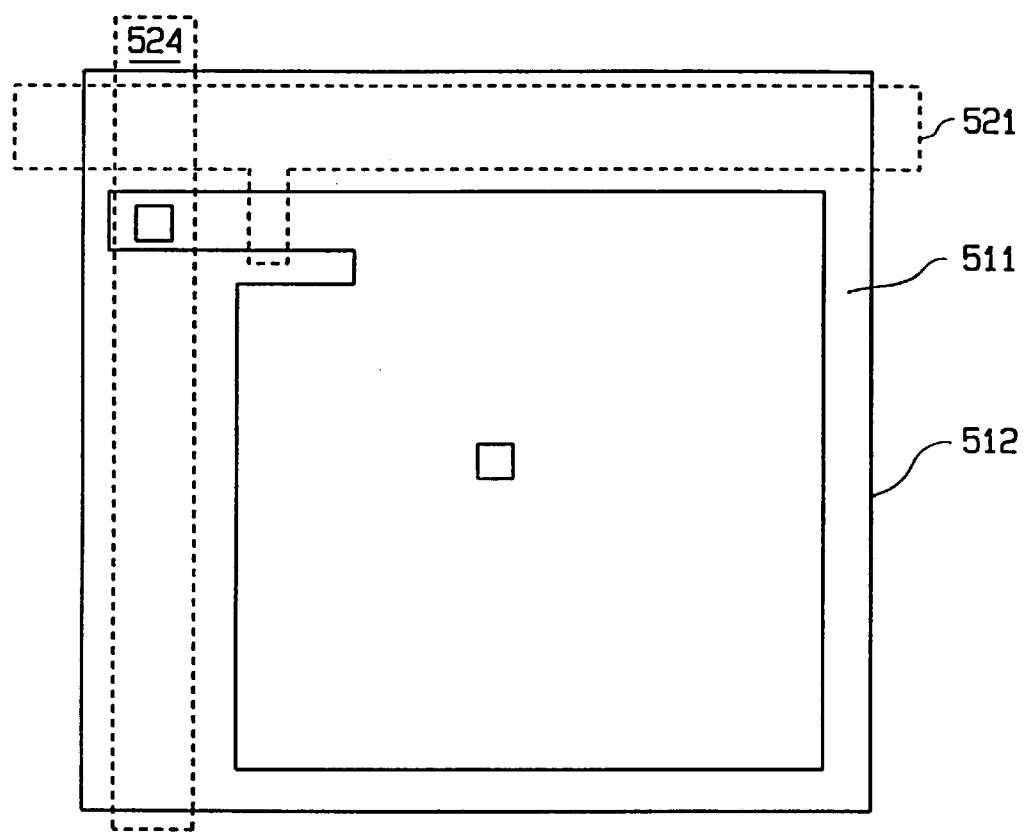

FIGS. 5B and 5C illustrate a schematic circuit diagram and the layout of an individual pixel 515. As shown, individual pixel 515 includes a reflective pixel electrode 511 to be physically in contact with the liquid crystal material, a MOS storage capacitor 512 for storing a video signal charge sufficient to drive the liquid crystal material between successive frame periods, and a MOS field effect transistor 513 operating as a switch to the pixel. The pixel is selected by applying an row scanning signal to the gate terminal of MOS transistor 513. When the pixel is selected and a video signal is provided to a source terminal 516 from the column bus 524, MOS transistor 513 is turned on and the video signal is provided from the source terminal to the drain terminal of the MOS transistor and to the pixel electrode and the capacitor.

Figure 6A:
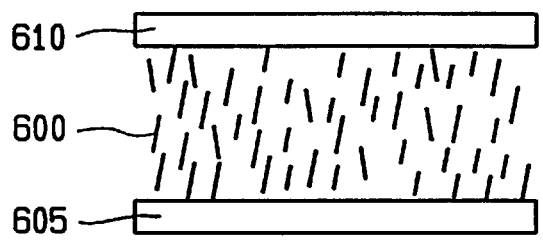
FIGS. 6A and 6B illustrate the operation of a single pixel cell having dynamic scattering liquid crystal material.
Figure 6B:
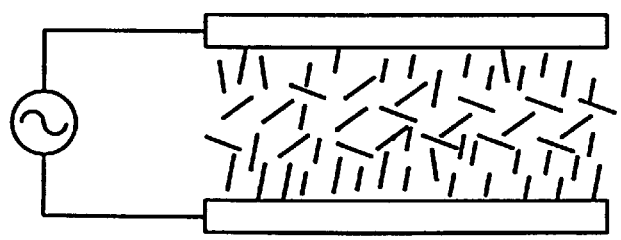

The principle of operation for a single pixel is now described in conjunction with FIGS. 6A and 6B. Referring to FIG. 6A, in each pixel, dynamic scattering ("DS") mode liquid crystal material 600 is disposed between a reflective pixel electrode 605 and a transparent ground electrode 610 formed on the cover glass. Before the liquid crystal material is filled in vacuum into the space between the reflective pixel electrode and the ground electrode, the surfaces of both electrodes are treated with a coupling agent such as alkoxysilane so that, when there is no electrical signal applied to the electrodes, molecules of the DS liquid crystal material are aligned perpendicularly to the electrodes. At this state, the DS liquid crystal material is transparent to light and an incident illumination will traverse the DS liquid crystal material and be reflected by the reflective display electrode. As a result, the pixel appears to have a silver color.

Referring to FIG. 6B, when a video signal is applied between the electrodes, the perpendicular alignment of the DS liquid crystal molecules is destroyed and the incident illumination is scattered. At this state, the pixel appears gray and the degree of grayness depends on the amplitude of the applied video signal.

When the entire array operates, gates of successive rows of the MOSFETs are turned on sequentially from top to bottoms by pulses from the row scanning bus drivers and appropriate video signals are simultaneously applied to the source terminals of the MOS transistors from the video signal buffer. The video signals charge the storage capacitors associated with the MOS transistors to levels related to the video signals. The charges stored in the capacitors are then retained for a frame period, leaking off slowly through the liquid crystal layer. As the capacitors are discharged through the DS liquid crystal layer, the layer produces a gray shade or an image that corresponds to the video signals applied to the capacitors during addressing.

For the transmissive-mode visual display shown in FIG. 2, a transmissive-mode LCD having a VLSI backplane is used. The VLSI backplane includes a thin substrate transparent to a backside illumination and thin layers of doped silicon or poly-silicon which is transparent to light as pixel display electrodes. Images are generated by illuminating the backside of the VLSI backplane and by providing video signals to pixel display electrodes to modulate the local transmissivity of the liquid crystal material to generate images.

The transmissive-mode VLSI backplane may be formed by first fabricating the array of pixels and its driving circuit on an opaque silicon substrate and subsequently thinning the substrate until it becomes transparent. Another way to fabricate the transparent. backplane is first forming a thin layer of single crystalline epitaxial silicon on a silicon dioxide substrate, fabricating the array and its driving circuit on the silicon layer, and then removing the silicon dioxide substrate.

Figure 7:
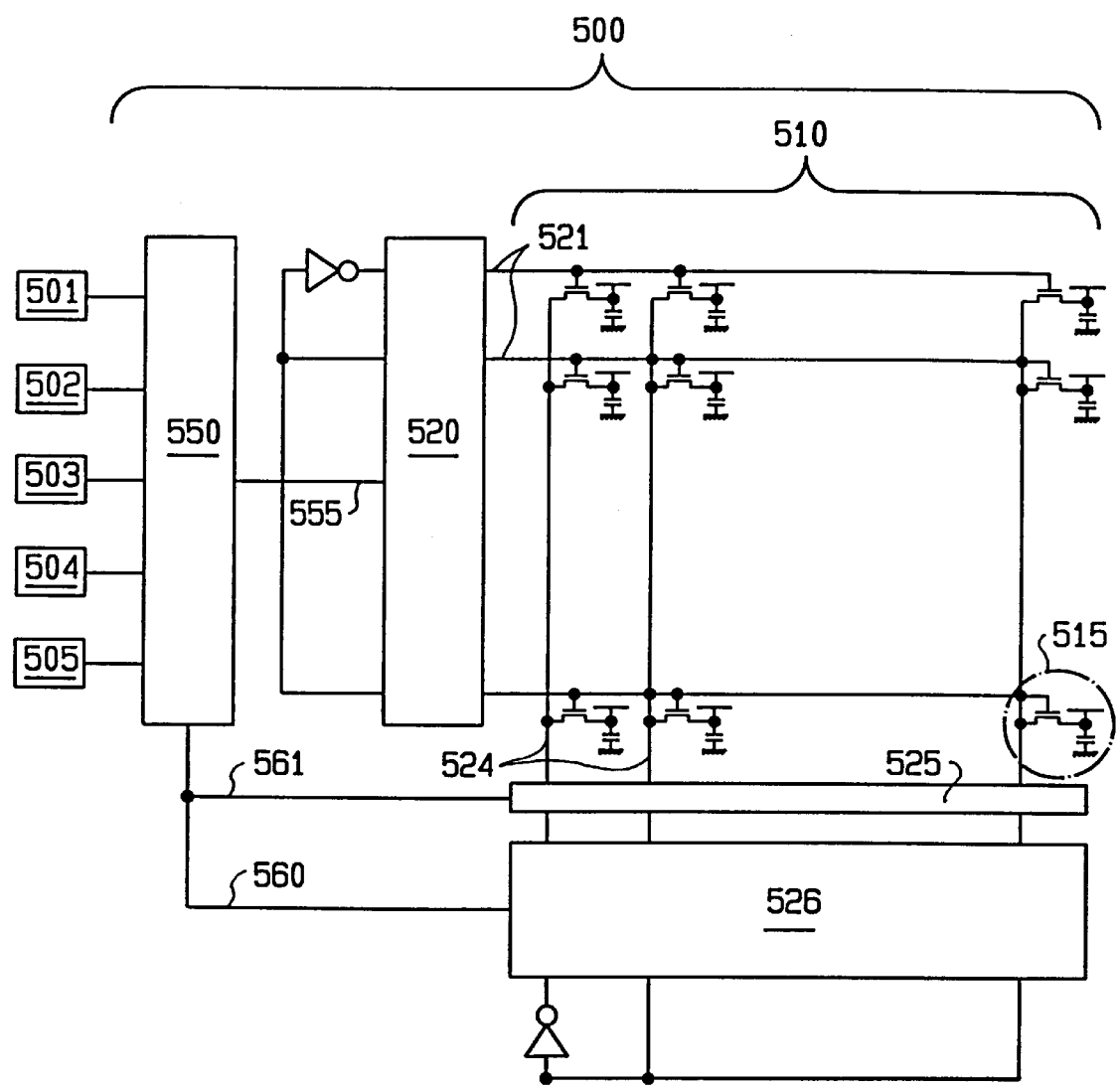
FIG. 7 illustrates an alternative embodiment of the VLSI backplane.

FIG. 7 illustrates the schematic circuit diagram of a VLSI backplane for another embodiment of the visual display, wherein like elements are similarly designated as those in FIG. 5A. As depicted, a VLSI backplane 500 includes inter alia a microprocessor 550 monolithically formed on the same substrate with a pixel array 510, a row scanning bus driver 520, a video signal driver 526 and a video signal buffer 525.

Illustratively, microprocessor 550 is interconnected to row bus driver 520 via a bus 555, to video signal driver 526 via a bus 560, and to video signal buffer 525 via a bus 561. The microprocessor receives input video signals and other signals through terminals 501–505 and processes the video signals before providing the processed signals to the row scanning bus driver, the video signal driver and the video signal buffer. Thus real-time image signal processing may be performed by the microprocessor. As it will be apparent to one of skill in the art, a signal processing circuit may be used in replace of or in combination with the microprocessor circuit.

In an alternative embodiment (not shown), a VLSI backplane including a matrix of microprocessors is provided. Each of the microprocessors is located in the vicinity of and associated with one or more pixels. The microprocessors are used to perform local-algorithm imaging processing tasks such as resolution enhancement by interpolation or contrast enhancement and are monolithically integrated with the pixel array and the driver circuits.

In another preferred embodiment, the visual display of the present invention incudes a miniature display having a VLSI backplane designed for reducing image aliasing. The backplane includes a pixel array with the positions of the pixels displaced by small random distances from the positions of pixels in a corresponding symmetrical array. This perturbation of pixel positions subtly breaks the symmetry and regularity of the pixel array and as a result greatly reduces image aliasing.

Figure 8:
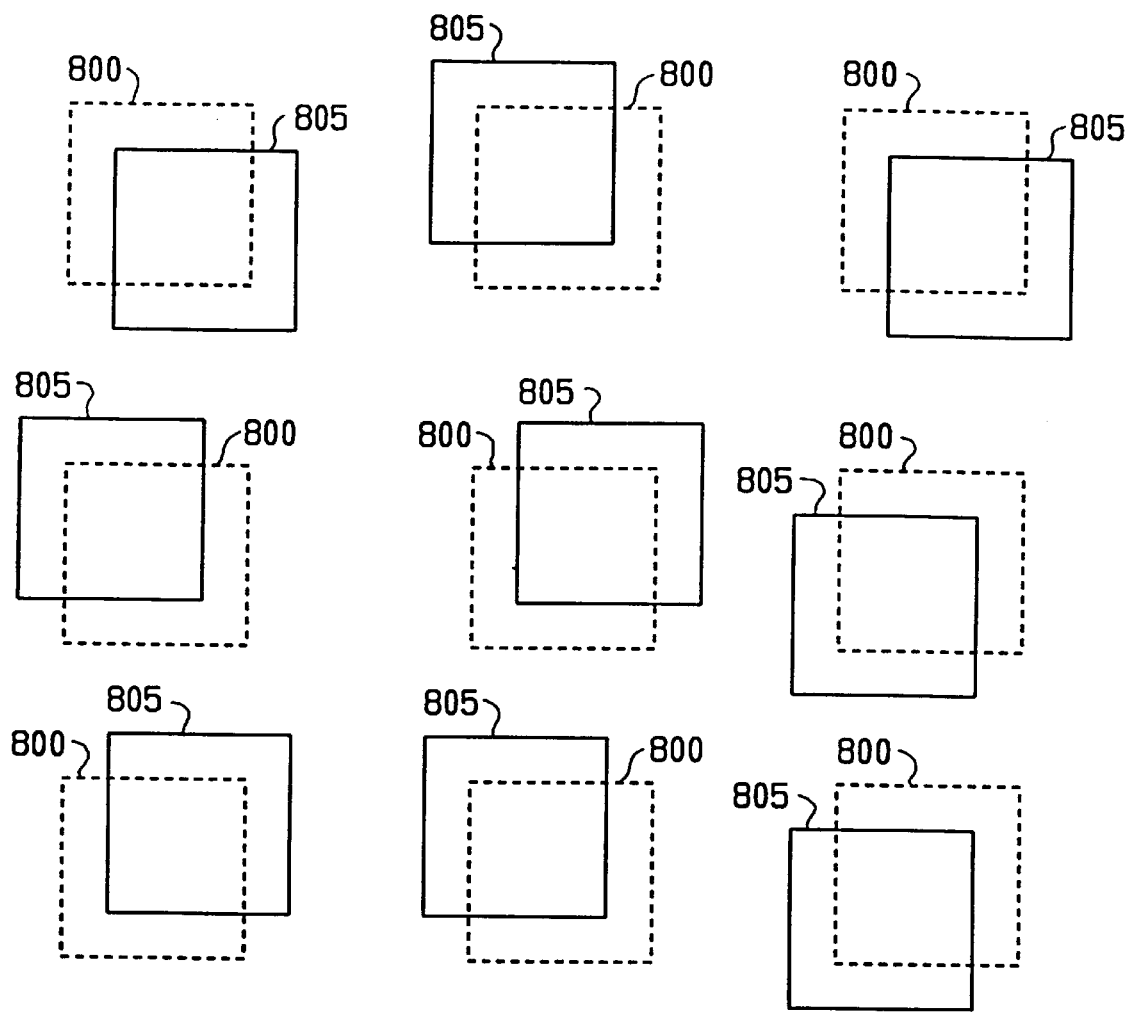
FIG. 8 illustrates a preferred embodiment of the visual display having an array of randomly displaced pixels for reducing image aliasing.

FIG. 8 illustrates the array of displaced pixels. In the drawing, pixels 800 represents a corresponding symmetrical array and pixels 805 are the result of displacing pixels 800 by small random distances. Preferably, the array is designed with the use of a software silicon compiler program and the displacement of pixel position is implemented by the use of such silicon compiler program. In designing the array with displaced pixels, factors such as the maximum allowable displacement for each pixel without noticeable image distortion and the minimum acceptable distance between the pixels should be considered. Those factors are important in preventing image distortion and pixel overlapping.

As compared with other available methods for reducing image aliasing which generally requires additional circuitry for real-time signal processing, the random displacement of pixel positions uses no additional circuitry and requires no real-time signal processing. Moreover, it can be accomplished by modifying existing silicon circuit design tools without substantially additional cost. It should be apparent to those skilled in the art that the present method for reducing aliasing by random displacement of pixel positions is applicable to any types of displays using a pixel array and it is not limited to LCDs.

Figure 9:
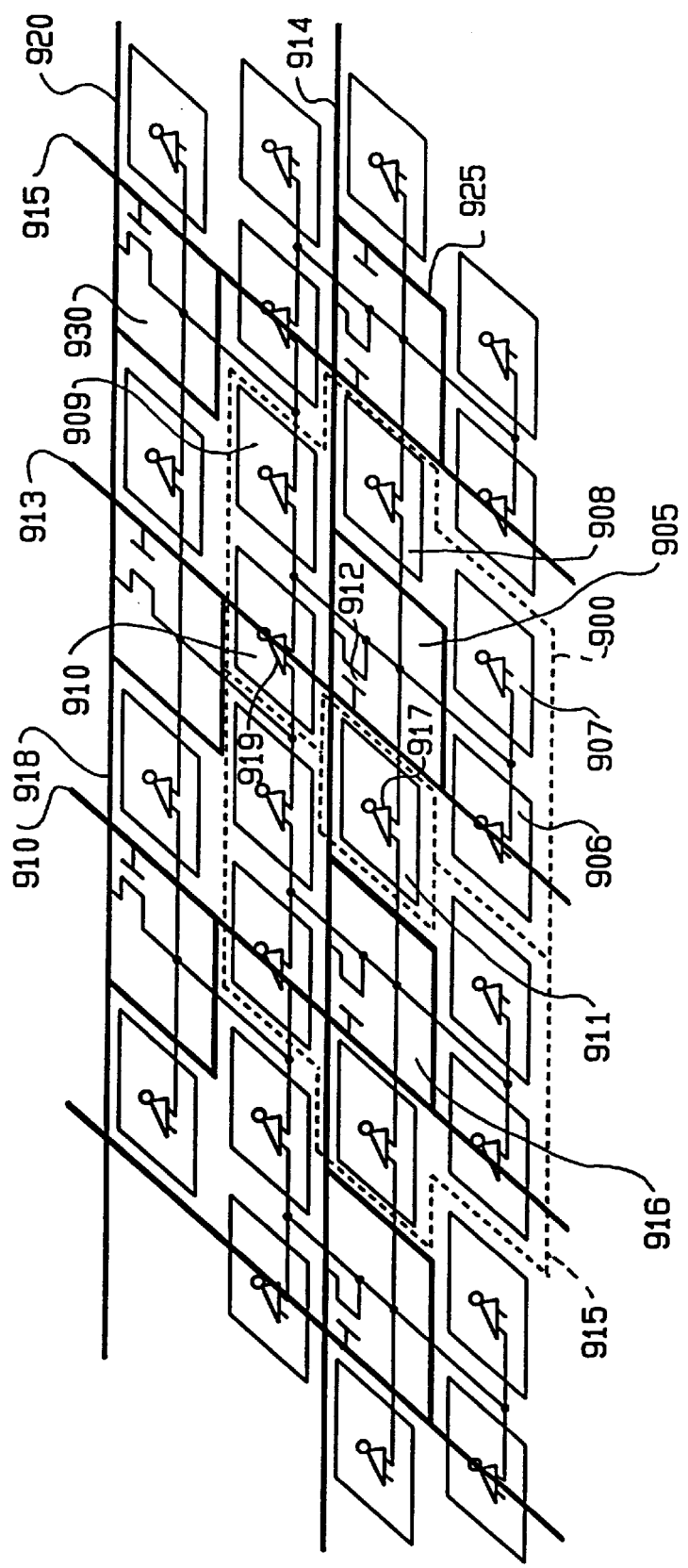
FIG. 9 depicts another preferred embodiment of the visual display having an array of super-pixels.

In another preferred embodiment, the visual display of the present invention includes a miniature display having an array of super-pixels for reducing image aliasing. As depicted in FIG. 9, each super-pixel comprises a central display element surrounded by a number of ancillary display elements and a switch MOSFET. For example, a super-pixel 900 includes a central display element 905 surrounded by ancillary display elements 906, 907, 908, 909, 910, and 911. Neighboring super-pixels share the ancillary display elements interposed between them. For example, super-pixels 900 and 915 share ancillary display elements 911.

In each super-pixel, only the central display element is directly driven by a driver circuit. For example, central display element 905 is driven by the driver circuit via MOSFET 912 through a row address line 913 and a column address line 914; its surrounding ancillary elements are not directly driven by the driver circuit through the address lines.

Each ancillary display element, however, is driven by a signal from an NAND gate responsive to two video signals from its neighboring central display elements. For example, ancillary element 911 is driven by a signal at the output of an NAND gate 917 which are responsive to video signals from neighboring central display elements 905 and 916.

Obviously, other types of circuits may also be used in addition to or place of the NAND gates. For example, instead of being responsive to the video signals of neighboring central display elements, the ancillary elements may response to signals other than the video signals of the two neighboring central display elements, which is also within the scope of the present invention.

In yet another preferred embodiment, the visual display of the present invention incudes a miniature display having a pixel array made to compensate for non-linear optical distortion of an optical system used to view the images display on the pixel array. Although there are currently available methods for compensating optical distortion in an artificially-generated "virtual-reality display" by, for example, pre-processing image data in real-time to pre-warp the image data before it is "distorted" by a lens and providing the processed data to a display, those methods generally require extensive hardware for real-time image processing and their utilities are thus severely limited.

The optical distortion of an optical system is characterized by an optical distortion function. To compensate for the optical distortion, the positions and shapes of the pixels in the array are determined in accordance with an inverse function of the optical distortion function. As a result, the effect of the optical distortion on the images that are finally seen through the optical system is substantially compensated. No real-time signal processing or additional circuitry is required.

Figure 10A:
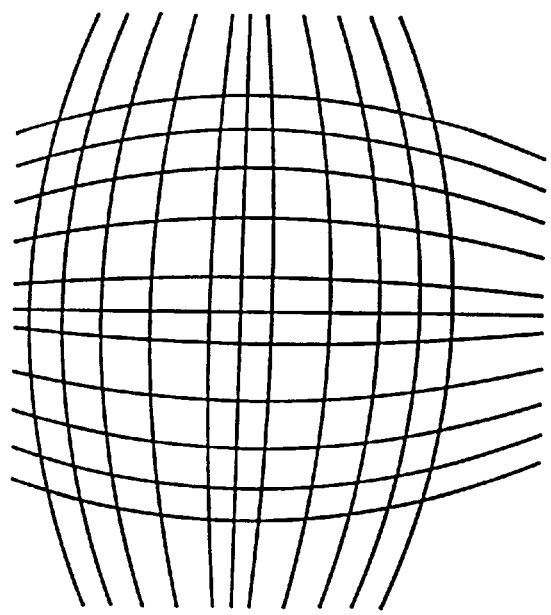
FIG. 10A illustrates the optical distortion of a magnifier having short focal length.

FIG. 10A illustrates what a regular square grid structure would look like if it is seen through a typical short-focal-length optical magnifier. The drawing shows that the image seen through the central portion of the magnifier is not distorted but at the periphery of the magnifier there is substantial distortion. It is seen that the local magnification M ($r_i$) of the magnifier decreases with an axial radius $r_i$ and each point on the image moves radially inward toward the center of the magnifier. This type of distortion, typically called negative or barrel distortion, is typical for a magnifier having a short focal length.

The optical distortion of an optical magnifier is characterized by an optical distortion function which can be determined by a ray tracing experiment. Generally the distortion function for a short focal length magnifier is radially symmetrical and monotonically increasing with the axial radius. After the distortion function of the magnifier is determined, the inverse function of the distortion function may be derived by, for example, a third order polynomial fit to the distortion function. The resultant inverse function for such magnifier may be expressed as $$D^{-1}(r_i) = (r_i + kr_i^3)$$

where $D^{-1}(r_i)$ is the approximate inverse function of the distortion function, $r_i$ is the axial radius of a point on the magnifier and k is a constant of approximately 0.32. FIG. 10B shows a computer-displayed drawing depicting the inverse distortion function for a LEEP-type optical system.

To compensate for the distortion introduced by an optical system used to view a pixel display, the inverse function of the distortion function is used to position and scale the individual pixels of the display. Since the pixel array is very regular, albeit of peculiar and specific form, a silicon compiler may be written to implement a scaleable architecture, where a pixel array can be "auto-instanced and routed" with the specification of only a few parameters such as DISTORTION_FUNCTION, CHROMATIC_ABERRATION, ARRAY_WIDTH, and PACKING_DENSITY.

Figure 10C:
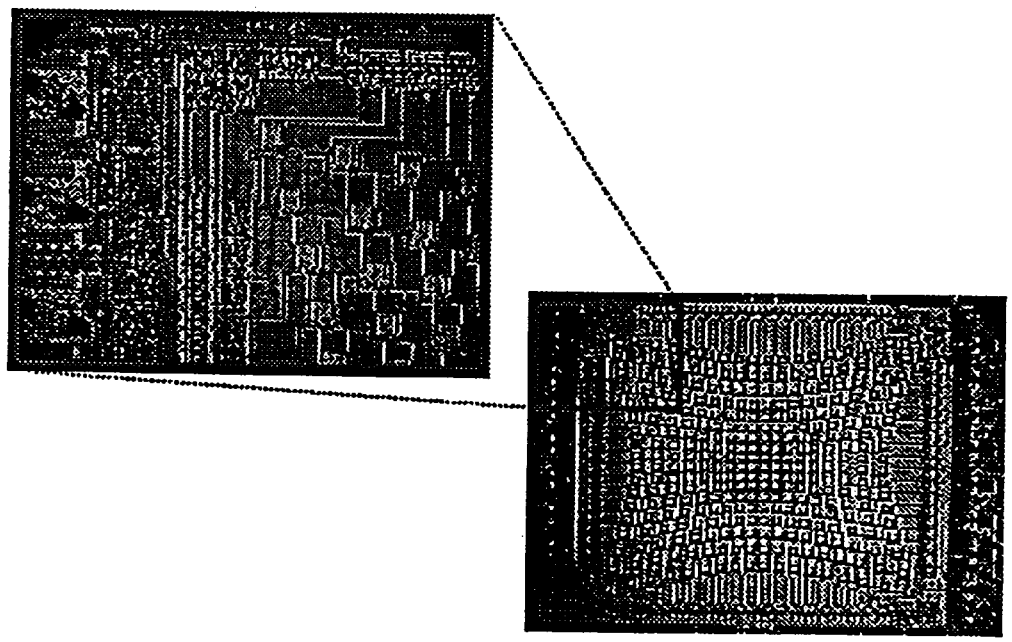
FIG. 10C shows a top view of a fabricated pixel array designed to compensate for optical distortion.
Figure 10B:
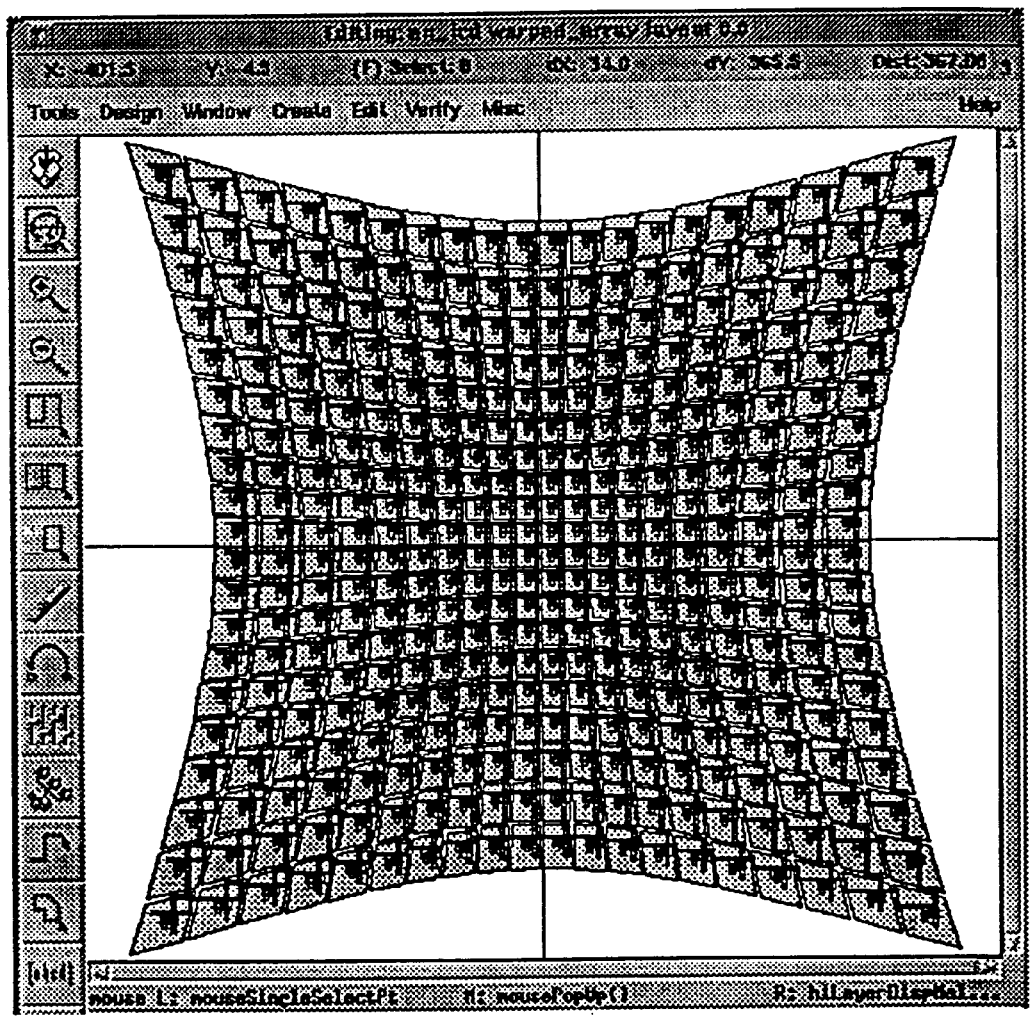
FIG. 10B shows a computer-displayed drawing depicting the inverse distortion function for a LEEP-type optical system.

FIG. 10C shows the top-view of a fabricated pixel array designed in accordance of the present invention to compensate for typical short-focal-length magnifier distortion. The layout of this array was generated with a silicon compiler program which may be written to even compensate for the varying warped pixel capacitance by adjusting the size of the buried storage capacitor for each pixel. The compiler program used is written in C computer language and it provides complete pixel array layout in the CADENCE design tool language called SKILL.

Alternative and additional description of the present invention is contained in the attached Appendix which is intended to be a part of specification of this patent application.

As will be apparent to those skilled in the art, numerous modifications to the present invention may be made within the scope of the present invention, which is not intended to be limited except in accordance with the following claims.

What is claimed is:

1. A visual display comprising:
    (a) a miniature liquid crystal display including (i) an array of display elements of sufficient resolution to provide a desired image quality, wherein said display elements are displaced by small random distances from the positions of elements in a corresponding symmetrical array, (ii) a VLSI circuit monolithically integrated with said array for driving said display elements to form images on the array that are generally too small to be viewed by the naked eye, said VLSI circuit including input terminals for providing electrical signals thereto to generate such images, (iii) a transparent cover positioned above said array of display elements, (iv) a transparent electrode deposited on the surface of the cover facing said array, and (v) a liquid crystal material disposed between said array and said transparent electrode; and
    (b) an optical system disposed in front of the miniature liquid crystal display for enlarging such images to be visible at the desired image quality to the naked eye or for recording such images such that they can be displayed or viewed by the naked eye.

2. The visual display of claim 1 wherein said VLSI circuit includes a signal processing circuit for processing signals applied through the input terminals to affect the displayed image.

3. The visual display of claim 1 wherein said VLSI circuit includes a microprocessor.

4. A virtual image display permitting a viewer to view images, comprising:
    (a) an eye glass frame;
    (b) at least one lens having a reflective or partially reflective surface mounted therein; and
    (c) a visual display positioned such that images displayed thereon are reflected by said lens into the eyes of a person wearing said frame, said visual display comprising:
        (i) a miniature liquid crystal display including an array of display elements of sufficient resolution to provide a desired image quality, and a VLSI circuit monolithically integrated with said array for driving said display elements to form images on the array that are generally too small to be viewed by the naked eye, said VLSI circuit including input terminals for providing electrical signals thereto to generate such images, wherein said miniature liquid crystal display is connected at its input terminals to a source of electrical signals for forming images; and
        (ii) an optical system disposed in front of the miniature display for enlarging such images to be visible at the desired image quality to the naked eye;
    wherein said reflective surface of said at least one lens is curved in accordance with a three-dimensional elliptical surface, and the visual display and the eye of the viewer are positioned at two focal points of said elliptical surface respectively such that the images displayed by said visual display are reflected by said reflective surface into the eyes of the viewer, and
    wherein the display elements in the array are displaced by small random distances from the positions of elements in a corresponding symmetrical array.

5. The virtual image display of claim 4 wherein said source is a video compact disc player.

6. The virtual image display of claim 4 further including a light source for providing illumination for the liquid crystal display.

7. The virtual image display of claim 6 wherein said light source is a light emitting diode.

8. A virtual image display permitting a viewer to view images, comprising:
    (a) an eye glass frame;
    (b) at least one lens having a reflective or partially reflective surface mounted therein; and
    (c) a visual display positioned such that images displayed thereon are reflected by said lens into the eyes of a person wearing said frame, said visual display comprising:
        (i) a miniature liquid crystal display including an array of display elements of sufficient resolution to provide a desired image quality, and a VLSI circuit monolithically integrated with said array for driving said display elements to form images on the array that are generally too small to be viewed by the naked eye, said VLSI circuit including input terminals for providing electrical signals thereto to generate such images,
        wherein said liquid crystal display comprises a transparent cover positioned above said array of display elements, a transparent electrode deposited on the surface of the cover facing said array, and a liquid crystal material disposed between said array and said transparent electrode; and
        (ii) an optical system disposed in front of the miniature display for enlarging such images to be visible at the desired image quality to the naked eye;
    wherein said reflective surface of said at least one lens is curved in accordance with a three-dimensional elliptical surface, and the visual display and the eye of the viewer are positioned at two focal points of said elliptical surface respectively such that the images displayed by said visual display are reflected by said reflective surface into the eyes of the viewer, and wherein the display elements in the array are displaced by small random distances from the positions of elements in a corresponding symmetrical array.

9. The virtual image display of claim 8 wherein said liquid crystal material is a dynamic scattering mode liquid crystal material.

10. The virtual image display of claim 9 wherein said VLSI circuit includes a microprocessor.

11. The virtual image display of claim 8 wherein said array comprises approximately 2,000×2,000 display elements formed on an area of approximately one square centimeter.

12. The virtual image display of claim 8 wherein said VLSI circuit includes a signal processing circuit for processing signals applied through the input terminals to affect the displayed image.

* * * * *